March 27, 1934.  G. LARSSON  1,952,264

ROCK DRILL

Filed Jan. 9, 1933

Inventor,
Gösta Larsson,
By Sommers & Young
attys.

Patented Mar. 27, 1934

1,952,264

UNITED STATES PATENT OFFICE 1,952,264

ROCK DRILL

Gösta Larsson, Roslags-Nasby, near Stockholm, Sweden

Application January 9, 1933, Serial No. 650,900
In Sweden January 12, 1932

4 Claims. (Cl. 255—64)

This invention relates to rock drills, and more particularly to that class of rock drills which are adapted for use in connection with rock drilling machines. Such drills usually comprise a rod of steel, either solid or hollow, which is provided with cutting edges at one end. Said edges are arranged in various ways, for instance, as four or six radially projecting arms.

The object of this invention is to provide a rock drill of the said kind which is more resistive than those heretofore known, thereby allowing an increased rate of boring speed, and increasing the life of the drill as well. To this end the cutting edges of a rock drill according to this invention are so arranged that one or more of them commence their cutting work prior to the remaining edges, all edges, however, being of the same outer diameter, so that all of them will work on the whole section of the bore hole.

This effect is obtained, according to the invention, by displacing the cutting edges with relation to each other in the longitudinal direction of the drill, so that two or more axially displaced sets of cutting edges will result, which, in the operation of the drill, start their cutting action at different time. Another method of obtaining the same result consists in forming one or more of the cutting edges with a more acute cutting angle than the remaining edges.

In the said first-mentioned case, a greater or smaller number of the cutting edges only will start the cutting operation, the remaining cutting edges getting into full action only after the most projecting cutting edges have been worn off to a certain degree. By reason of this fact, the bit may present sharp cutting edges for a longer while than otherwise and, moreover, the drill may center itself more readily so that a more cylindrical hole may be obtained, and unnecessary removal of material may be avoided. These and also other circumstances contribute to enable an increase of the rate of boring speed. Practical experiments with drills constructed according to the invention have shown that the boring speed may be increased by about 15% above the speed which may be obtained with drills having no displaced cutting edges. In the said other case, the more acute edges will remain sharp for a longer while than the others.

In the accompanying drawing, some embodiments of the invention are illustrated.

Figure 1:
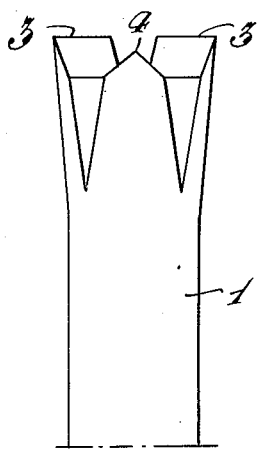
Figure 3:
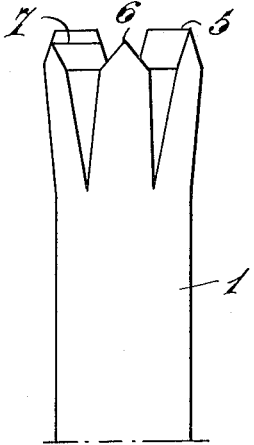
Figure 2:
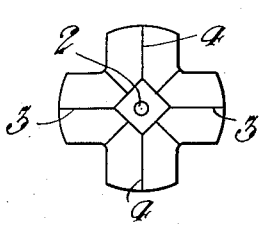
Figure 4:
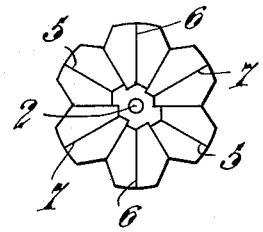

Fig. 1 is a side elevation, and Fig. 2 is an end view of one embodiment. Figs. 3 and 4 are similar views of a second embodiment, Figs. 5 and 6 show a third embodiment.

Figs. 1 and 2 illustrate a drill comprising a rod 1 which may be either solid or formed with a central boring, as indicated at 2 in Fig. 2. Formed at one end of the rod 1, is a bit comprising, for instance, four radially extending edges, symmetrically disposed about the axis of the rod, as represented by the boring 2. Every second cutting edge, as indicated by the numeral 3, extends beyond by the others, indicated by the numeral 4. It is thus evident that the said first mentioned edges 3 will first engage the stone, and start cutting therein, before the edges 4 come into operation. Both the cutting edges 3 and the cutting edges 4 extend at right angle to the longitudinal axis of the rod 1 so that the cutting edges 3 and 4 lie in two parallel surfaces at right angle to the axis of the rod.

Figs. 3 and 4 illustrate a drill similar to that shown in Figs. 1 and 2, though with the bit comprising six radially extending cutting edges displaced with relation to each other so as to form three sets of axially displaced edges, respectively indicated by the numerals 5, 6 and 7 in the order appearing from Fig. 4. The operation of this drill is similar to that described in connection with Figs. 1 and 2, with the exception that the cutting edges will start their operation in three stages, that is to say, the edges 5 will first come into action, then the edges 6, and finally the edges 7.

Figure 5:
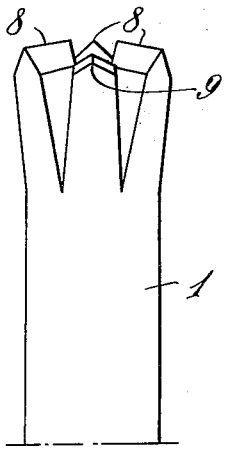
Figure 6:
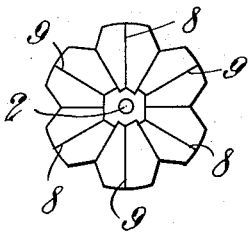

Figs. 5 and 6 show an embodiment in which six cutting edges are provided which are displaced so as to form two sets of axially displaced edges, respectively indicated by the numerals 8 and 9. In this case, both the edges 8 and the edges 9 are inclined downwardly from the axis of the drill so that, in the example shown, the edges lie in two parallel or substantially parallel conical surfaces. The cutting edges 8 project to their entire length beyond the cutting edges 9. This, of course, is not absolutely necessary, and also other modifications may be made without departing from the principle of the invention. Thus, for instance, a different number of cutting edges may be used than that shown in the drawing, and, furthermore, the cutting edges may be disposed so as to form more than two axially displaced sets.

In the embodiments shown in Figs. 5–6, the angle represented by the outer corner of each cutting edge, is obtuse so that the corner will be more positively supported than the corner of the edges shown in Figs. 1–4, and, moreover, the risk of the said outer corners alone striking the stone and having to withstand the whole force of the rock drilling machine will be reduced.

In producing the cutting edges, stamps may be used having grooves corresponding to the edges desired cut therein to different depths, the producing of the edges being effected by bringing such stamps in engagement with the heated end of the rod 1, and subjecting them to the blows of a hammer, or to a pressing action. This operation also causes the heated end to widen conically.

It is further to be noted that the invention may also be applied to detachable bits, attached to the end of the drill rod in one way or the other.

What I claim is:—

1. A rock drill having a plurality of cutting edges, which all extend substantially to the same outer diameter, said edges being arranged so as to form at least two axially displaced sets of edges situated in substantially parallel surfaces of revolution, inclined to the longitudinal axis of the drill.

2. A rock drill having a plurality of cutting edges, which all extend substantially to the same outer diameter, said edges being arranged so as to form at least two axially displaced sets of edges situated in substantially parallel surfaces of revolution, inclined to the longitudinal axis of the drill and axially displaced with relation to each other to such an extent that the edges of each set project to their entire length beyond the edges of the next set.

3. A rock drill having a plurality of integral cutting edges, which all extend substantially to the same outer diameter, said edges being arranged so as to form at least two axially displaced sets of edges situated in substantially parallel surfaces of revolution, inclined to the longitudinal axis of the drill.

4. A rock drill having a plurality of cutting edges inclined with respect to the longitudinal axis of the drill and all extending substantially to the same outer diameter, said cutting edges forming a crown with alternate cutting edges displaced axially with relation to the remaining edges so as to project to their entire length beyond said remaining edges.

GÖSTA LARSSON.